United States Patent
Flannery

(10) Patent No.: US 8,790,770 B2
(45) Date of Patent: Jul. 29, 2014

(54) CROSS-WOVEN SPUNLACE COMPACTED TOWEL WITH RECOVERABLE TEXTURE

(76) Inventor: John C. Flannery, Laguna Niguel, CA (US)

( * ) Notice: Subject to any disclaimer, the term of this patent is extended or adjusted under 35 U.S.C. 154(b) by 716 days.

(21) Appl. No.: 13/127,437

(22) PCT Filed: Nov. 2, 2009

(86) PCT No.: PCT/US2009/062994
§ 371 (c)(1), (2), (4) Date: May 3, 2011

(87) PCT Pub. No.: WO2010/053875
PCT Pub. Date: May 14, 2010

(65) Prior Publication Data
US 2011/0217503 A1    Sep. 8, 2011

Related U.S. Application Data

(60) Provisional application No. 61/111,080, filed on Nov. 4, 2008.

(51) Int. Cl.
| | |
|---|---|
| *B32B 3/02* | (2006.01) |
| *B32B 3/30* | (2006.01) |
| *B32B 5/02* | (2006.01) |
| *B65B 11/02* | (2006.01) |
| *B65D 75/20* | (2006.01) |
| *A47K 10/02* | (2006.01) |
| *B65D 81/20* | (2006.01) |

(52) U.S. Cl.
CPC . *B65D 75/20* (2013.01); *B32B 3/30* (2013.01); *B32B 5/02* (2013.01); *B32B 3/02* (2013.01); *B65D 81/2023* (2013.01); *A47K 10/02* (2013.01); *B65B 11/02* (2013.01); *Y10S 206/812* (2013.01)
USPC ............ 428/172; 428/76; 428/137; 428/218; 442/408; 206/581; 206/404; 206/410; 206/812; 53/427; 53/435; 53/436

(58) Field of Classification Search
CPC ......... D04H 1/46; D04H 1/465; D04H 1/495; A47K 10/02; B65D 75/20; B65D 81/2023
USPC ................ 428/76, 137, 172, 218; 442/408; 206/404, 410, 581, 812; 53/427, 435, 53/436
See application file for complete search history.

(56) References Cited

U.S. PATENT DOCUMENTS

| | | | | |
|---|---|---|---|---|
| 2,689,642 | A * | 9/1954 | Franke | 206/389 |
| 3,563,241 | A | 2/1971 | Evans et al. | |
| 3,613,875 | A * | 10/1971 | Franke | 206/225 |
| 4,109,353 | A | 8/1978 | Mitchell et al. | |
| 4,208,459 | A | 6/1980 | Becker et al. | |
| 4,241,007 | A | 12/1980 | Tanaka et al. | |
| 6,202,845 | B1 * | 3/2001 | Hill | 206/449 |
| 6,746,976 | B1 | 6/2004 | Urankar et al. | |
| 2002/0120246 | A1 | 8/2002 | Buzot | |

(Continued)

*Primary Examiner* — Jenna Johnson
(74) *Attorney, Agent, or Firm* — Knobbe Martens Olson & Bear LLP

(57) ABSTRACT

A towel is formed by hydro-entanglement of an isotropic web formed of predominantly rayon. The towel comprises a surface texture formed during hydroentangling. The towel is compacted into a cake or disk shape for distribution. The cake or disk shape can expand when exposed to moisture such that the towel recovers to substantially the original dimensions and texture.

21 Claims, 2 Drawing Sheets

(56) References Cited

U.S. PATENT DOCUMENTS

2003/0029740 A1* 2/2003 Caveness ............... 206/210
2004/0102752 A1 5/2004 Chen et al.
2005/0136777 A1 6/2005 Thomaschefsky et al.
2005/0165371 A1 7/2005 Giacometti

* cited by examiner

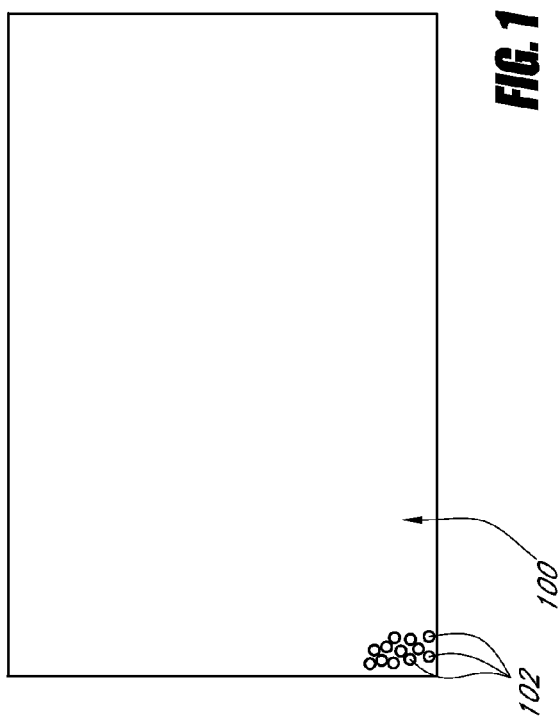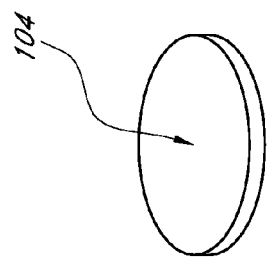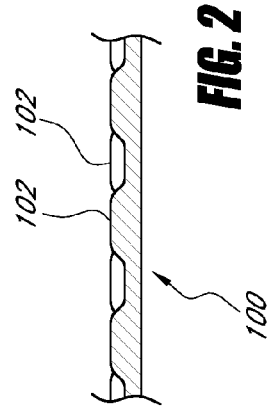

CROSS-WOVEN SPUNLACE COMPACTED TOWEL WITH RECOVERABLE TEXTURE

BACKGROUND OF THE INVENTION

1. Field of the Invention

The present invention generally relates to compacted towels formed of hydroentangled or spunlace nonwoven fabric. More particularly, the present invention relates to compacted towels that have surface textures that recover following compaction and wetting and that have improved strength and wear characteristics due to being formed in both a machine direction and a cross lapping direction.

2. Description of the Related Art

Compact towels have been formed by spunlace techniques. The towels have included single direction webs (i.e., fibers arranged in the machine direction). The webs are hydroentangled by running web formed by carding the fibers into a single direction sheet and then subsequently passing the sheet under water jets to entangle the fibers. The resulting material is nonwoven and, in currently available compact towels, the material exhibits low resistance to tearing in the machine-direction (i.e., a direction perpendicular to the cross machine direction).

This single direction material is less than desirable because it easily comes apart when used as a towel. This single direction material also cannot be cut to be a exact size because one side is stronger than the other which leads to dimensional instability under stress.

SUMMARY OF THE INVENTION

Accordingly, a stronger biodegradable nonwoven towel is desired that can be compressed into a compacted towel, or cake, and that can recover with respect to dimensions and textures when the compacted towel is expanded for use. In some configurations, a compacted nonwoven can be prepared that, when reconstituted with water from a compressed state, produces a wipe, towel, cleaning cloth, or the like. The fabric can have substantially balanced machine direction/cross direction properties, a weight of between about 30 and about 120 GSM, at least one surface with a mild abrasive property, and a composition that includes cellulosic fiber for good compaction and water holding properties. In some configurations, the fabric can be a textured spunlace fabric but any composition from 50/50 rayon/PET to 100% cellulosic would be acceptable. In some configurations, the fabric can be a thermobond fabric with a high rayon content in a blend with a thermoplastic fiber that bonds the structure with heat and pressure. In some other configurations, the fabric can be a thermobond airlay pulp sheet with embossing for surface texture. Such a fabric may require a large amount of bonding fiber in order to recover from compression. In yet other configurations, the fabric can comprise needle punch and print bond nonwovens.

BRIEF DESCRIPTION OF THE DRAWINGS

These and other features, aspects and advantages of the present invention will now be described with reference to the drawings of a preferred embodiment, which embodiment is intended to illustrate and not to limit the invention.

FIG. 1 is a top plan view of a towel that is arranged and configured in accordance with certain features, aspects and advantages of the present invention.

FIG. 2 is a simplified section view of the towel of FIG. 1.

FIG. 3 is a perspective view of a compacted cake.

DETAILED DESCRIPTION OF THE PREFERRED EMBODIMENT

Figure 4:
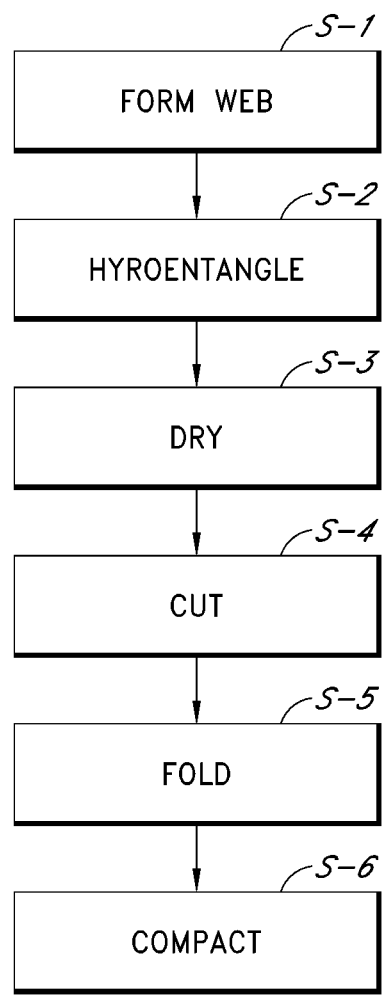
FIG. 4 is a flow chart of a manufacturing process.

FIG. 1 illustrates a towel 100 that is arranged and configured in accordance with certain features, aspects and advantages of the present invention. The towel 100 can be formed of a spunlace or hydroentangled nonwoven fabric.

Advantageously, the towel 100 comprises a surface texture comprising a plurality of bumps, nubs, or other surface relief features 102. In some configurations, the plurality of bumps, nubs, or other surface relief features 102 can form a repeating pattern. Other configurations are possible. The bumps, nubs or other surface relief features 102, which can include apertures, advantageously create reservoirs or channels to contain dirt during scrubbing. Thus, such features 102 improve the scrubbing properties of the towel 100.

The towel 100 can be formed in any suitable manner. In some configurations, the towel 100 is formed of cellulous fibers. Preferably, the fibers used are selected from the group consisting of rayon, tencel, cotton and wood pulp, bleached cotton, a corn-based polymer (e.g., PLA or poly-lactic-acid), linen, flax, hemp, jute, and polyester fiber from recycled bottles. More prefereably, the fibers used are selected from the group consisting of rayon, tencel, and bleached cotton. In some configurations, the fibers are a blend of one or more of the above-mentioned fibers.

The towel 100 can be formed of 100% rayon or of a blend that features low levels of polyester. For example, in some configurations, a 70/30 rayon and polyethylene terephthalate (PET) blend can be used with a weight of about 1.75 ounces per square yard. In such configurations, the fibers preferably are formed into an isotropic web and the web is not carded. In some configurations, a blend of rayon and PET can be used with a weight of about 2.0 ounces per square yard. In such configurations, the fibers preferably form an isotropic web. In yet other configurations, a 50/50 blend of rayon and PET with a weight of about 2.0 ounces per square yard can be used. The resulting fabric can have a pattern of apertures or the like that are formed in 8 inch by 8 inch, 12 inch by 12 inch or 16 inch by 16 inch repeating patterns. In such configurations, the fibers preferably form an isotropic web with a substantially 5% finish. In some such configurations, bico fiber in the range of about 7% to about 10% can be used to enhance toughness and abrasion resistance. In some configurations, a blend of 60/40 pulp and PET can be used.

Preferably, the use of polyester is limited in forming the fabric for the towel 100 because, as will be discussed, the towel 100 is designed for compaction and biodegradability and polyester resists compaction and biodegrading. With that said, it is possible to form the towel of a material comprising up to about 40-50% PET fiber content. It is believed that this level of PET fiber content may not impair compaction in a significant enough manner to be unworkable. Nevertheless, in some configurations, biodegradability is desired. Accordingly, the towel 100 preferably is formed of 100% rayon to provide a compactable and biodegradable product. Other suitable blends also can be used keeping in mind a desire for biodegradability, good strength characteristics in both the machine direction and the cross direction and a desire for resilient texturing that can recover following compression and compaction into a compacted towel, as will be discussed.

Any suitable process can be used for fabric used for formation of fabric used for the towel 100. One process is shown in the flow chart of FIG. 4. In some configurations, the fibers are dry mixed in a hopper. The fibers are distributed to define a web that will form the fabric used to make the towel 100. S-1. To distribute the fibers, the fibers can be fed through a card. Generally speaking, the card uses wire to comb the fibers out so that the fibers are all pointing in a first direction (e.g., east and west). The fibers in the first direction are then combined with fibers that are arranged in a second direction (e.g., north and south). Other manners also can be used to attain an isotropic web of fibers or a random or cross laid formation of the fibers. Web formation has been found to play a major role in strength of the towel 100 once compressed (i.e., cake strength) and in wipe dimensional stability after recovery from the compressed state. An isotropic, random or cross laid formation is believed to be far superior to a single direction carded web in both cake strength and wipe stability.

As used herein, the weight per unit of size (e.g., ounces per square yard or grams per square meter) is determined in part by how many layers of fibers are combined. In other words, more layers result in larger weights per unit of size.

By arranging the fibers to form an isotropic web, the resulting fabric can have improved strength characteristics in both the machine direction as well as the cross direction. As used herein, "machine direction" refers to the direction that the fibers travel as the fabric is produced. Also, as used herein, "cross direction" refers to a direction generally perpendicular to the direction that the fibers travel as the fabric is produced.

The web can be passed under high pressure water jets. See S-2. In some configurations, the web is subjected to multiple rows of very fine water jets coming from a manifold at a pressure of between about 1000 psi and about 6000 psi. In some embodiments, the water jets spray water at about 2000 psi to about 4000 psi manifold pressure. The water jets impact the web, which is supported on a very fine mesh support. The water jets cause entanglement of the fibers and form the fabric for the towel 100. The entangled fabric thereby obtains good strength and dimensional stability.

The mesh support can be a very fine screen material or the like. The mesh support defines a porous screen. To create the bumps, nubs, apertures or other surface relief features 102, the mesh support can be modified. For example, because the fibers are entangled on the surface of the support, creating a surface texture on the surface of the support can lead to creation of bumps, nubs and other surface relief features due to movement of the fibers during entanglement. Thus, the bumps, nubs, basket weave or other surface relief (e.g., overall engineered print, which uses surface relief features that are all about the same in a single material) preferably are created during entanglement on a modified porous screen.

One way to create the desired surface relief is to impart onto the surface of the screen a desired pattern (e.g., pyramids or other surface textures). Another way to create the desired surface relief is to create a negative by embossing on the screen directly which creates a pattern in the material of the screen itself. With a patterned screen, during the hydroentanglement, the fibers move into the valleys defined between the peaks on the screen. Thus, the fabric develops thicker regions in the regions of the valleys on the screen.

While the fabric can be formed with surface relief using the patterned screen, the surface relief is difficult to develop in very light fabrics (e.g., less than about 30 grams per square meter). In some configurations, the fabric has a weight within the range of about 30 grams per square meter to about 120 grams per square meter. Better results (e.g., texturing, compaction and recovery) are believe to be obtained forming fabrics in the about 60 to about 90 grams per square meter range. More preferably, fabrics can formed in the range of about 45 to about 65 grams per square meter. In one preferred embodiment, the fabric can have a weight of about 60 grams per square meter. Even more preferably, the fabric can have a weight of about 60 grams per square meter with a difference about +/−six percent. Fabric weights above about 90 grams per square meter are believed to make difficult the necessary movement of the fibers to form durable nubs.

Patterns and textures imparted to a nonwoven material during the entanglement process are believed to be greatly more recoverable after compaction than patterns and textures imparted by embossing following entanglement. This is believed to result because forming the relief pattern during the entanglement process causes the fibers to move to form the relief pattern. Thus, the fiber to fiber bonds are established within the relief pattern. Preferably, the energy level of the jets performing the entanglement is sufficient to work fully through the material so that a desired level of entanglement occurs throughout the thickness of the surface relief.

Once the spunlace fabric is formed, the fabric is dewatered. See S-3. Any suitable dewatering technique can be used. In some configurations, the water can be squeezed from the fabric between rubber rolls. Squeezing the fabric is believed to cause a water reduction to about 300%. A vacuum roll or vacuum slot can be used to further reduce the water content to about 175%. Finally, heat and air (e.g., steam cans, ovens, high velocity air jets) can be used to get the water content down to about 5%, which is about the expected water content in 100% rayon sheets, for example.

In some configurations, a squeeze roll water extractor/finish applicator can be used to apply a finish to the fabric that could include polish, cleaner, lemon scent, soap, shampoo, color, or other active ingredients. As discussed directly above, in some configurations, a water extractor may be used and, in such embodiments, some type of finish applicator such as a spray prior to the squeeze rolls can be used to add any desired additives such as those mentioned above. Finish can be a component in many types of wipes and towels. Desirably, any additive is selected to not retard the compaction efficiency or to not harm the integrity of the compacted product.

With the fabric made, the fabric can be cut into sheets usable for towels or other end products. See S-4. The fabric can be cut into the desired size using any commonly recognized machines, such as a Hudson-Sharpe or Gerber. In some configurations, the towel 100 can have a length of about 15 inches and a width of about 15 inches. In other configurations, the towel 100 can have a length of about 11 inches and a width of about 8.5 inches. Preferably, the length of about 11 inches and the width of about 8.5 inches varies by as little as about 0.4 centimeters. Advantageously, the towel 100 can have a width of about 8.5 inches, which allows the full fabric width to be utilized because the fabric has a width of about 154 cm or about 61 inches. Thus, seven pieces can be formed across the width of the material with a minimal amount of about 1.5 inches left over depending upon the tolerances held during cutting. Of course other dimensions are possible. Moreover, machines currently used to manufacture spunlace fabrics range in width from about 50 inches to about 200 inches. In addition, the output from these machines can be adjusted within several inches of the nominal width for the machine.

Sheet size is a consideration for various wiping products with several ranges desired for most end uses. A sheet size of around 100 square inches is desired for a personnel care wipe, while a sheet size of around 400 square inches is desired for a spa towel and a larger size may be required for certain cleaning/polishing applications. The balanced web properties achieved with the fabric described herein allow for either dimension of the fabric to be used as the machine direction of the fabric. In other words, because the fabric is dimensionally stable in both directions (i.e., machine direction and cross direction) and because the fabric has improved strength characteristics, it is possible to orient the towels or other wiping products in either direction of the fabric without concern for the reduced strength and dimensional stability exhibited in prior products.

With the fabric sheets cut into the towels 100, the towels 100 are ready for compacting into cakes 104. Generally speaking, the size and weight of the fabric will determine how small a compacted product can be produced The diameter of the cake preferably is selected based either on the weight and size of the towel 100 or some safety or marketing need. For example, for a large heavy towel, a large diameter is used to keep the compacted product from becoming too bulky which can harm the integrity of the compacted cake. In the case of a baby wipe, a small diameter might be acceptable, but a choking risk can dictate a larger diameter per CPSC regulations.

With a desired diameter determined, the cut towel 100 is folded into a suitable form for compression into a compact cake of the diameter, thickness, and density desired. See S-5. For instance, if the towel is 10 inches wide by 10 inches long and a cake is desired that is 1.5 inches in diameter, it may be best to fold the towel into something no more than 1.5 inches wide with the corners being tucked under. In some configurations, the folded towel can be formed into a roll (e.g., spiral) before being inserted into the compaction device. In some configurations, the towel 100 is folded by picking up the towel in a central portion such that the edges of the towel hang downward in a conical or centrally tented shape. In other words, when picked up, the towel resembles an upside down ice cream cone.

Preferably, the cake has a diameter of between about 1.5 inches and about 2.5 inches. In some configurations, the cake has a diameter of about 4.5 centimeters with a thickness of about 0.32 centimeters. Preferably, in such configurations, the diameter with vary less than about 0.3 centimeters. In some configurations, the cake has a diameter of about 1.75 inches. Preferably, the cake has a thickness of between about 0.5 inch and about 0.125 inch. In some configurations, the cake has a thickness of about 0.125 inch. Other sizes are possible. In some other configurations, the cake formed from a towel that has a length of about 11 inches and a width of about 8.5 inches has a diameter of about 1.75 inches, a thickness of about 0.125 inch and a density of about 0.857 grams per cubic centimeter. In yet other configurations, the cake formed from a towel that has a length of about 25 inches and a width of about 16 inches has a diameter of about 1.75 inches, a thickness of about 0.5 inch and a density of about 0.890 grams per cubic centimeter.

The folded towel can be compacted using any suitable compacting process. See S-6. In some configurations, the compacting process is that described in U.S. Pat. No. 4,241, 007, which was issued to Mitsubishi Rayon Co. on Dec. 23, 1980, which is hereby incorporated by reference in its entirety. In some configurations, the towels 100 are formed within a 1.75 inch diameter cylinder/piston device where the dry prefolded spunlace nonwoven fabric is compressed under a force of about 1100 kilograms per square centimeter to about 1500 kilograms per square centimeter. In some configurations, the fold pattern used to prepare the wipe for compaction is important to achieving a smooth surface compacted product and also to ease the recovery of the wipe when wet. Typically, the desired fold pattern will vary with the size of the towel and the desired size and density of the resulting cake and the shape of the finished product. In the configurations such as those described above where the towel is simply picked up to be folded, the towel can be loaded into a compacting machine by introducing first the lower portion of the towel into a funnel-shaped opening of the compacting machine. Once positioned in the compacting machine, the compacting machine compresses the towels 100 into the cakes.

The weight (i.e., the grams per square centimeter) of the towel also can impact the function of the towel and how well it will compact. Heavier weight towels will allow a smaller wipe size that can still be effective and that can reduce cost but if the towel is too heavy, the integrity of the compacted cake can be adversely impacted.

During or after compacting of the towel, the compacted cake can be embossed with identifying characteristics. For example, the compacted cake can be embossed with a logo during the compression of the towel into the cake configuration. Preferably, the cake is compressed to a density of between about 0.647 grams per cubic centimeter and about 0.778 grams per cubic centimeter. More preferably, the cake is compressed to a density of between about 0.840 grams per cubic centimeter and about 0.900 grams per cubic centimeter. Even more preferably, the cake is compressed to a density of between about 0.850 grams per cubic centimeter and about 0.890 grams per cubic centimeter. Embossing is a benefit of the process and a specific density of the cake can be important to obtaining a good level of definition in the embossed design. Density is the result of the compaction force and generally is within certain limits to produce a successfully compacted product. Some of these values are included in the Mitsubishi patent and others are higher due to the design of the wipe/towel.

Following compaction, the cakes preferably are wrapped into a cover. In some configurations, the cakes can be wrapped within a shrink wrap material. Preferably, at least a portion of the cakes is covered. For example, as shown in FIG. 4, the protective covering can extend over the outer circumference and can wrap onto a portion of an upper surface and a lower surface. In such configurations, the upper surface and the lower surface of the cake preferably is covered by a paperboard material or the like. The paperboard material can be a disc-shaped advertisement or can contain a logo, barcode or other identifying information. In some configurations, the cake is completely enclosed within a protective covering.

In some configurations, the compactness of the cake depends at least in part upon the protective covering. The covering reduces the likelihood of undesired swelling during marketing or storage. For example, an unprotected towel in a humid environment can swell by as much as about 50% of its fully compacted size (e.g., compacted thickness may be 0.375 inch that swells to 0.5625 inch). In some embodiments, in an 80+% humidity environment, the unwrapped towel can grow as much as 33-100% over the course of a few days.

In some configurations, the cakes can be individually wrapped. In other configurations, the cakes can be wrapped together in multiples. For example, ten or more cakes can be stacked together and wrapped in a tube. In some configurations, a plurality of unwrapped cakes can be stored within a air tight or liquid impermeable zippered bag. Other manners of protecting or distributing the cakes also can be used. In some configurations, the weight of each compacted towel that is about 8.5 inches wide by about 11.5 inches long prior to compaction is about 3.62 grams. Preferably, the weight for such compacted towels is between about 3.2 grams and about 4 grams. More preferably, the weight for such compacted towels is between about 3.29 grams and about 3.96 grams.

To render the compacted towel useful, the cake is wet or immersed in water. As water is absorbed by the cake, the cake will expand and generally return to the shape and texture of the folded towel. Once the cake has expanded, the excess water can be squeezed from the towel and the towel can be unfolded for use.

In some configurations, towels can be made from 100% rayon. The weight can be about 75 grams per square meter with a range from about 50 grams per square meter to about 80 grams per square meter. The material can be formed in an entanglement pattern with a raised nub. The web formation can be cross-laid. The sizing can be about 8.5 inches by about 11 inches. The color can be natural without any additives added for a finish. The wipe can be compacted to a diameter of about 1.75 inches with a thickness of about 0.125 inch. The compacted towel can be embossed with a logo in some embodiments and can be unembossed in other embodiments.

In some configurations, a larger towel can be formed of 100% rayon. The weight can be about 60 grams per square meter. The material can be formed in an entanglement pattern with a raised nub. The web formation can be cross-laid. The sizing can be about 16 inches by about 25 inches. The color can be natural and no finish preferably is used. The towel can be compacted to a diameter of about 1.75 inches with a thickness of about 0.5 inch. The compacted towel can be embossed with a logo in some embodiments and can be unembossed in other embodiments. Preferably, the towel is enclosed in a plastic overwrap.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A method of making a compacted towel comprising forming a web of predominantly cellulosic material, the web having a crossing fiber configuration, entangling the fibers using hydroentanglement on a patterned substrate such that a resulting material comprises a surface relief, drying the resulting material, cutting a towel from the resulting material, and compacting the towel into a cake.

2. The method of claim 1, wherein the predominantly cellulosic material comprises 100% rayon.

3. The method of claim 1, wherein the predominantly cellulosic material is dry mixed in a hopper.

4. The method of claim 1, wherein the predominantly cellulosic material is distributed to define a web of material.

5. The method of claim 4, wherein fibers defining the web are carded.

6. The method of claim 1, wherein the patterned substrate comprises a very fine mesh support.

7. The method of claim 1, wherein fabric formed by hydroentanglement is dewatered.

8. The method of claim 1, wherein the cake comprises a diameter of between about 1.5 inch and about 2.5 inch.

9. A compacted towel comprising a predominantly cellulosic fabric that is hydroentangled from an isotropic web, said fabric comprising a surface relief pattern and said towel being compacted to a density of between about 0.840 grams per cubic centimeter and about 0.900 grams per cubic centimeter.

10. The compacted towel of claim 9, wherein the surface relief pattern comprises a plurality of bumps.

11. The compacted towel of claim 9, wherein the surface relief pattern comprises a plurality of apertures.

12. The compacted towel of claim 9, wherein the cellulosic fabric is formed of cellulosic fibers selected from the group consisting of rayon, tencel, cotton and wood pulp, bleached cotton, corn-based polymers, linen, flax, hemp, jute and polyester fibers from recycled bottles.

13. The compacted towel of claim 9, wherein the cellulosic fabric is formed of cellulosic fibers selected from the group consisting of rayon, tencel, and bleached cotton.

14. The compacted towel of claim 9, wherein the towel comprises a 70/30 blend of rayon and polyethylene.

15. The compacted towel of claim 14, wherein fibers of the blend are formed into an isotropic web and wherein the web is not carded.

16. The compacted towel of claim 9, wherein the towel fabric comprises all rayon.

17. The compacted towel of claim 9, wherein the towel is compacted into a cake having a diameter of at least 1.5 inches.

18. The compacted towel of claim 17, wherein the cake has a diameter of less than about 2.5 inches.

19. The compacted towel of claim 17, wherein the cake is enclosed in an individual wrapper.

20. The method of claim 1, further comprising applying a finish to the resulting material, wherein the finish includes polish, cleaner, lemon scent, soap, shampoo, color, or other active ingredients.

21. The compacted towel of claim 9, further comprising a finish on the fabric, wherein the finish includes polish, cleaner, lemon scent, soap, shampoo, color, or other active ingredients.

* * * * *

UNITED STATES PATENT AND TRADEMARK OFFICE
CERTIFICATE OF CORRECTION

Page 1 of 1

PATENT NO. : 8,790,770 B2
APPLICATION NO. : 13/127437
DATED : July 29, 2014
INVENTOR(S) : Flannery It is certified that error appears in the above-identified patent and that said Letters Patent is hereby corrected as shown below:

In the Drawings,

Sheet 2 of 2 (Referral Numeral No. S-2, FIG. 4) at line 1, Change "HYROENTANGLE" to --HYDROENTANGLE--.

In the Specification,

In column 2 at line 26, Change "prefereably," to --preferably,--.

Signed and Sealed this
Fifth Day of May, 2015

Michelle K. Lee
*Director of the United States Patent and Trademark Office*